Dec. 10, 1957  C. R. PIEPER  2,815,554
FASTENING DEVICE
Filed Jan. 17, 1955

INVENTOR.
CHESTER R. PIEPER
BY Terry & Cohn
ATTORNEYS

United States Patent Office 2,815,554
Patented Dec. 10, 1957

2,815,554

FASTENING DEVICE

Chester R. Pieper, Clayton, Mo.

Application January 17, 1955, Serial No. 482,029

5 Claims. (Cl. 24—243)

This invention relates generally to improvements in a fastening device, and more particularly to improvements in a device of this type adapted to secure together material such as cloth plies.

It is an important object of this invention to realize a fastening device which is simple and durable in construction, economical to manufacture, easy to assemble, and which can be quickly and easily manipulated to secure material such as cloth plies.

Briefly summarized, the fastening device consists of a stud-carrying portion having spaced arms between which the material to be fastened is normally located, a stud slidably carried by one of the arms, and a shoulder on the other arm, the stud being slidably movable to a closed position to clamp the material between the stud and the shoulder.

Another important objective is realized in the provision of aligned apertures in the spaced arms of the stud-carrying portion, the stud being slidably carried in one aperture, the other aperture being defined by a margin constituting a shoulder located laterally of the stud. This particular structural arrangement enables clamping of the material upon displacing the stud to a closed position.

Other important advantages and objects are realized by the provision of a spring action in the stud-carrying portion which permits selective expansion of the aperture adjacent the shoulder to accommodate material of different thicknesses. In addition, the provision of a spring action in the stud-carrying portion which causes frictional retention of the stud in any position in its aperture, facilitates the application of the device to the material to be fastened.

Still another important object is realized by the provision of a locking means between the stud and the stud-carrying portion which permits the stud to be securely, selectively locked in the closed position.

The foregoing and numerous other objects of the invention will more clearly appear from the following detailed description of a preferred embodiment, particularly when considered in connection with the accompanying drawing, in which.

Figure 3:
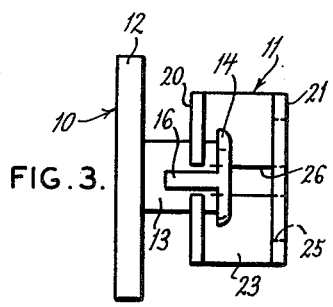
Fig. 3 is an enlarged top plan view of the fastening device shown in an open position.
Figure 1:
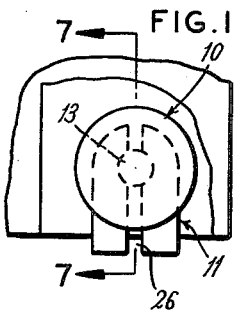
Fig. 1 is a front elevational view of the fastening device shown in a closed position and secured to cloth plies.
Figure 2:
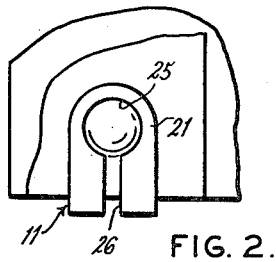
Fig. 2 is a rear elevational view of the fastening device shown in Fig. 1.

Referring now by characters of reference to the drawing, the fastening device consists of two coacting parts, namely, a stud generally indicated at 10 and a stud-carrying portion referred to at 11.

The stud 10 includes a head 12 and shank 13, one end of shank 13 being integrally connected to head 12, and the opposite free end being provided with an enlarged flange 14 of circular cross section. For reasons which will later appear, the flange 14 is provided with a rounded peripheral surface 15. Extending longitudinally along shank 13 is a pair of oppositely disposed ribs 16 constituting abutments in certain angular positions of the stud to fix the relative positions of the stud 10 and stud-carrying portion 11, all of which will be more clearly explained upon further description of the structural arrangement of the device. Each of ribs 16 extends from flange 14 longitudinally along shank 13 to a point spaced from head 12.

The stud-carrying portion 11 is of a substantially U-shape structure including spaced arms 20 and 21 connected by an integral bridging piece 23. Provided in arm 20 is a circular aperture 24 having a normal diameter that is slightly smaller than the diameter of shank 13 of stud 10. Another circular aperture 25 is provided in opposite arm 21, in register and aligned with aperture 24. However, aperture 25 has a larger diameter than rounded flange 14, the functional advantage of which will later appear. A slot 26 is provided in stud-carrying portion 11, extending medially down the length of arm 20 to communicate with aperture 24, then extending centrally through bridging piece 23, and thence along arm 21 to communicate with aperture 25. Since arms 20 and 21, and bridging piece 23 are split by slot 26, a spring action is realized which enables the arms 20 and 21 to spread and contract laterally.

Figure 4:
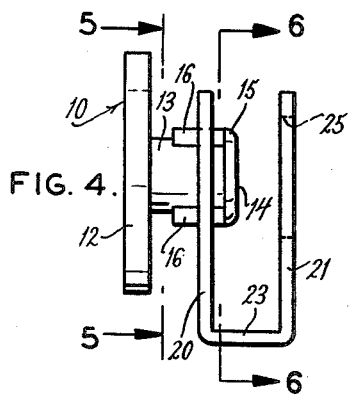
Fig. 4 is a side elevational view of the fastening device shown in Fig. 3.
Figure 5:
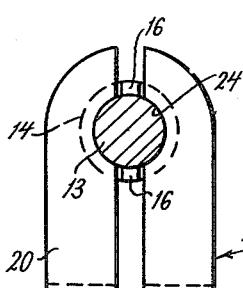
Fig. 5 is a view, partly in cross section, as seen along line 5—5 of Fig. 4.
Figure 6:
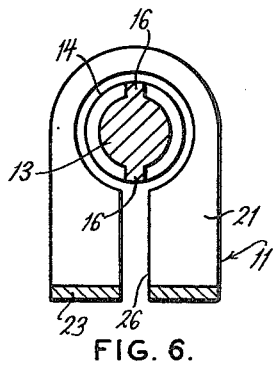
Fig. 6 is a view, partly in cross section, as seen along line 6—6 of Fig. 4.
Figure 9:
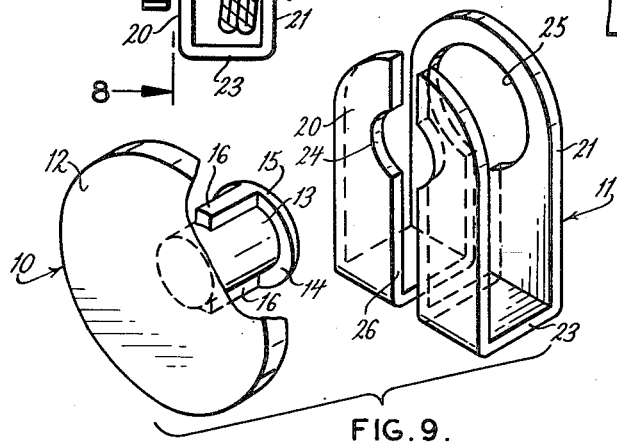
Fig. 9 is an exploded, perspective view of the stud and stud-carrying portion of the fastening device.

Fig. 9 shows the parts of the fastening device disassembled. To assemble the stud 10 to the stud-carrying portion 11, the flange 14 of stud 10 is pressed through aperture 24. The peripheral margins defining aperture 24 will ride over rounded surface 15, and will snap about shank 13. The spring-action of arm 20 will permit aperture 24 to enlarge sufficiently for this purpose. The flange 14, when fully inserted as is shown in Figs. 3–5, will abut arm 20, and will prevent unintentional disassembly of the stud 10 from the stud-carrying portion 11.

The slot 26 in arm 20 is of sufficient width immediately adjacent aperture 24 so as to receive ribs 16. When ribs 16 are aligned with slot 26, the stud may be displaced inwardly to a closed position or outwardly to an open position. The margins of aperture 24 frictionally grip shank 13 and serve to retain the stud at any position within the range of slidable movement, as for example in the open position shown by Figs. 3–4.

Figure 7:
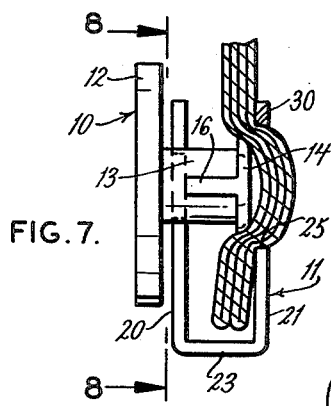
Fig. 7 is an enlarged cross sectional view of the fastening device and cloth plies, as seen along line 7—7 of Fig. 1.
Figure 8:
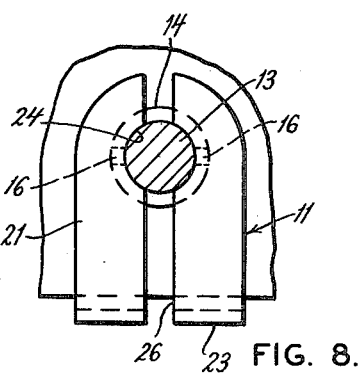
Fig. 8 is a view, partly in cross section, as seen along line 8—8 of Fig. 7.

To secure together material such as several cloth plies, the material is placed between arms 20 and 21 of stud-carrying portion 11. Then the stud 10 is slidably moved inwardly through aperture 24, the ribs 16 moving through slot 26 communicating with aperture 24. The stud 10, and in particular, the flange 14 of shank 13 engages the material and forces it through aperture 25. The margin defining aperture 25 constitutes a shoulder 30 (Fig. 7) located laterally outwardly of the stud. The material is clamped between flange 14 and shoulder 30. When in the fully closed position, as is shown by Figs. 7–8, the ribs 16 are located completely within arms 20 and 21. Then, the stud 10 is angularly displaced so as to move ribs 16 out of alignment with slot 26. As is shown in Figs. 7–8, the ends of ribs 16 abut the inner surface of arm 20 to prevent accidental axial displacement of stud 10, and hence serve as abutments to retain the stud 10 in the fully closed position. It is apparent that the spacing between head 12 and ribs 16 should be sufficient to accommodate the thickness of arm 20.

Material of various thicknesses can be fastened quickly and easily by the cooperative action of stud 10 and stud-carrying portion 11. If necessary, the aperture 25 can be expanded under the spring-action afforded by split arms 20 and 21, whereby to accommodate thicker cloth plies. This spring-action of arm 21 will realize an even tighter clamping of the material between shoulder 30 and the flange 14 of stud 10. Because of the particular structural arrangement of flange 14 and shoulder 30, if the material fastened together is pulled in any direction, such force tends to urge the flange 14 and shoulder 30 even closer together in the direction of such force, thereby realizing a self-tightening feature.

To release the material, the stud 10 is angularly displaced to align ribs 16 with slot 26, and then is slidably moved outwardly through aperture 24.

Although the invention has been described by making detailed reference to a single preferred embodiment, such detail is to be understood in an instructive, rather than in any restrictive sense, many variants being possible within the scope of the claims hereunto appended.

I claim as my invention:

1. A fastening device comprising a stud-carrying portion having spaced arms between which the material to be fastened is located, each of said arms being provided with an aperture, a stud slidably carried and located in one said aperture, the other aperture being defined by a shoulder located laterally of said stud, said stud being slidably movable to a closed position so as to clamp the material between said stud and said shoulder, each arm being split from its aperture to provide a lateral spring action of said arms that enables the stud to be frictionally retained in any position in the aperture in which it is carried, and enables the aperture in the other arm to expand laterally to accommodate material of varying thickness, and means for locking said stud in the closed position.

2. A fastening device comprising a substantially U-shaped stud-carrying portion including spaced arms between which the material to be fastened is located, one of said arms being provided with an aperture, a stud having a shank larger than said aperture yet slidably carried in said aperture, a shoulder on the other said arm, the stud being slidably movable to a closed position so as to clamp the material between the stud and the shoulder, the arm carrying said stud being provided with a slot communicating with said aperture to provide a lateral spring action that tends to retain the stud frictionally at any position in said aperture, and an abutment on said stud adapted to move through said slot, the abutment being adapted to engage the apertured arm as the stud is turned to move the abutment out of register with said slot so as to lock the stud in the closed position.

3. A fastening device comprising a substantially U-shaped stud-carrying portion including spaced arms between which the material to be fastened is located, said arms being provided with aligned apertures, a stud slidably carried in the aperture of one arm, the aperture in the other arm being larger than said stud so that the margin defining the aperture constitutes a shoulder, the stud being slidably movable to a closed position so as to clamp the material between the stud and said shoulder, the last said other arm being provided with a slot that communicates with the aperture forming the shoulder to provide a lateral spring action that enables the last said aperture to expand laterally to accommodate material of varying thickness.

4. A fastening device comprising a substantially U-shaped stud-carrying portion including spaced arms between which the material to be fastened is located, one of said arms being provided with an aperture, a stud having a shank larger than said aperture yet slidably carried in said aperture, the other arm being provided with a second aperture aligned with the first said aperture, the second aperture being larger than the stud to provide a shoulder laterally of said stud, the stud being slidably movable to a closed position so as to clamp the material between the stud and said shoulder, said arm carrying the stud being provided with a slot communicating with said first aperture so as to provide a lateral spring action that tends to retain the stud frictionally at any position in said aperture, the said other arm being provided with a second slot communicating with the said second aperture so as to realize a lateral spring action that enables lateral expansion of said second aperture to accommodate material of varying thickness, and means for locking said stud in said closed position.

5. A fastening device comprising a substantially U-shaped stud-carrying portion including spaced arms between which the material to be fastened is located, one of said arms being provided with an aperture, a stud slidably carried in said aperture, the other arm being provided with a second aperture aligned with the first said aperture, said second aperture being larger than said stud to provide a shoulder located laterally of said stud, the stud being slidably movable to a closed position so as to clamp the material between said stud and said shoulder, the arms being provided with an elongate slot interconnecting and communicating with said apertures, whereby to provide a lateral spring action that enables lateral expansion of said second aperture to accommodate material of different thickness, and an abutment on said stud adapted to move through said slot, the abutment engaging the arm adjacent the first aperture to lock the stud in the closed position, incident to turning the abutment out to register with said slot.

References Cited in the file of this patent

UNITED STATES PATENTS

| | | |
|---|---|---|
| 195,400 | Richard | Sept. 18, 1877 |
| 218,772 | Racer | Aug. 19, 1879 |
| 432,177 | Bernard | July 15, 1890 |
| 625,567 | Kingston | May 23, 1899 |
| 791,331 | Doxsee | May 30, 1905 |
| 2,267,331 | Guyot | Dec. 23, 1941 |
| 2,279,769 | Von Horst | Apr. 14, 1942 |
| 2,348,618 | Gordon | May 9, 1944 |
| 2,524,649 | Buhler | Oct. 3, 1950 |

FOREIGN PATENTS

| | | |
|---|---|---|
| 653,153 | France | 1928 |